April 25, 1967 A. SKRAPITS ET AL 3,315,502
AUTOMOBILE HOOD LOCKING LATCH DEVICE
Filed Oct. 22, 1965 3 Sheets-Sheet 3
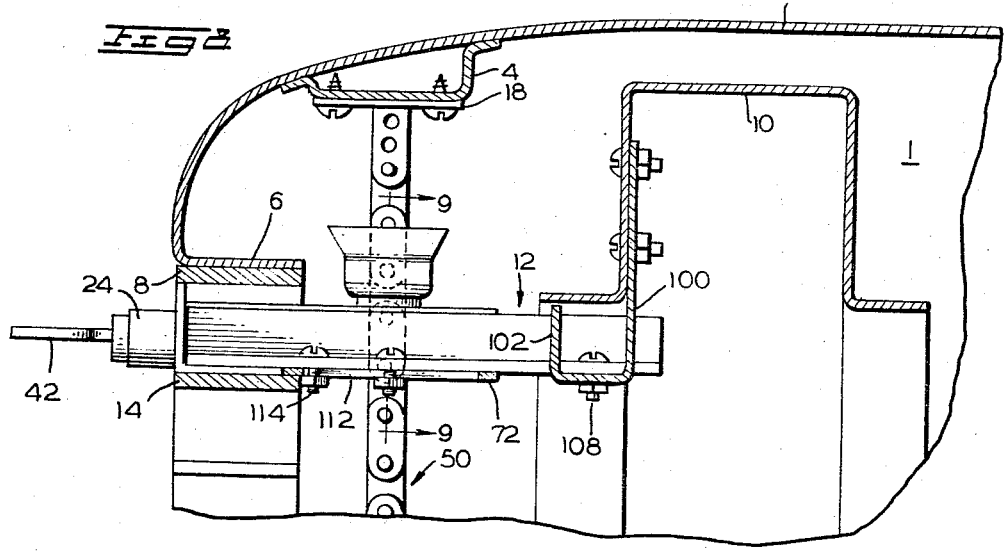
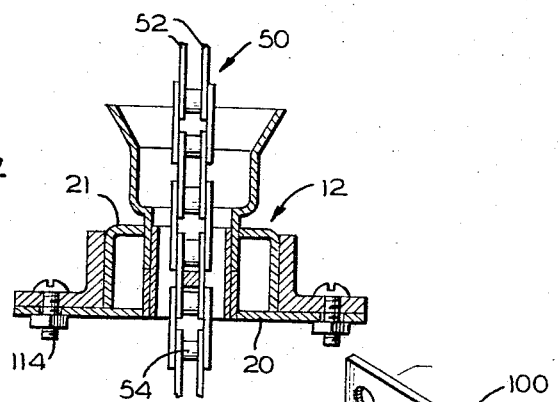
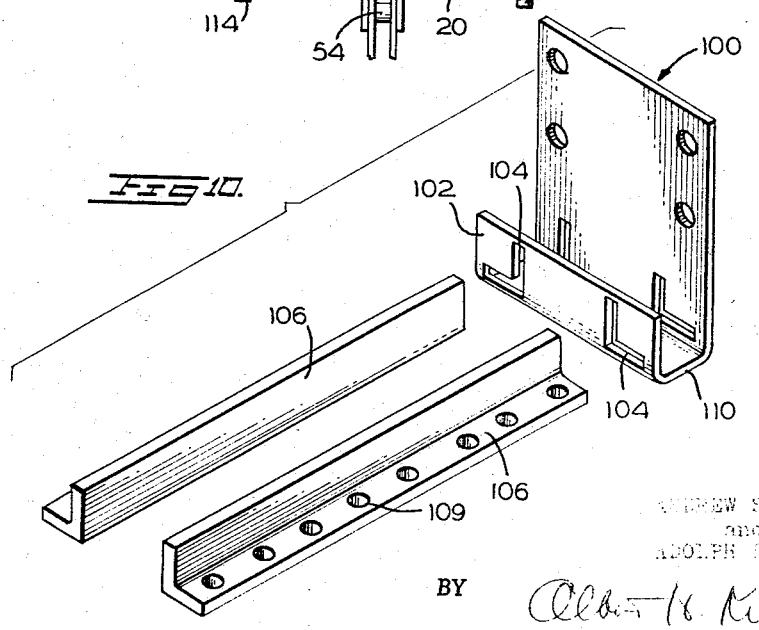
INVENTOR
ANDREW SKRAPITS
and
ADOLPH BRAUN
BY Albert H. Kirchner
ATTORNEY

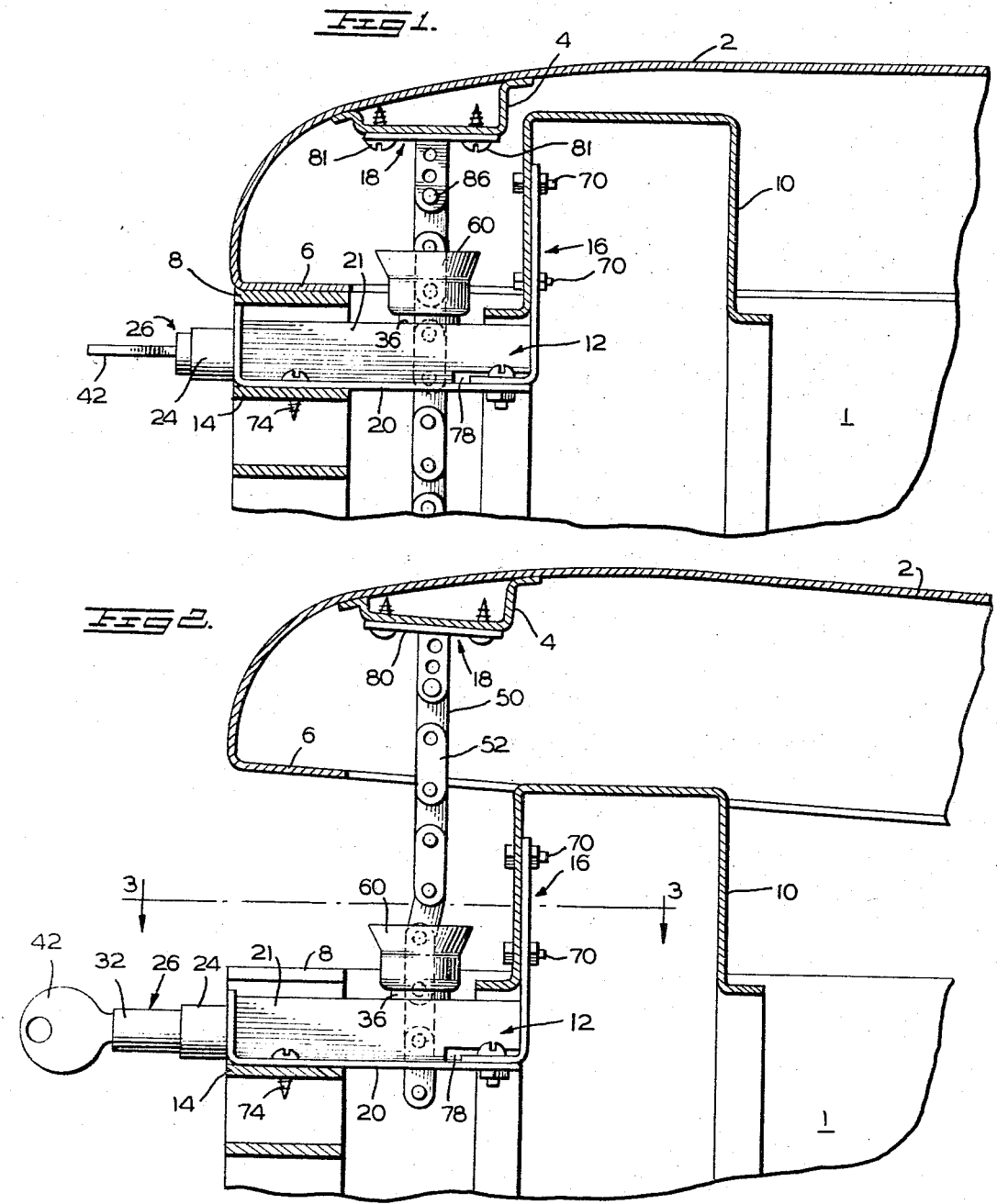

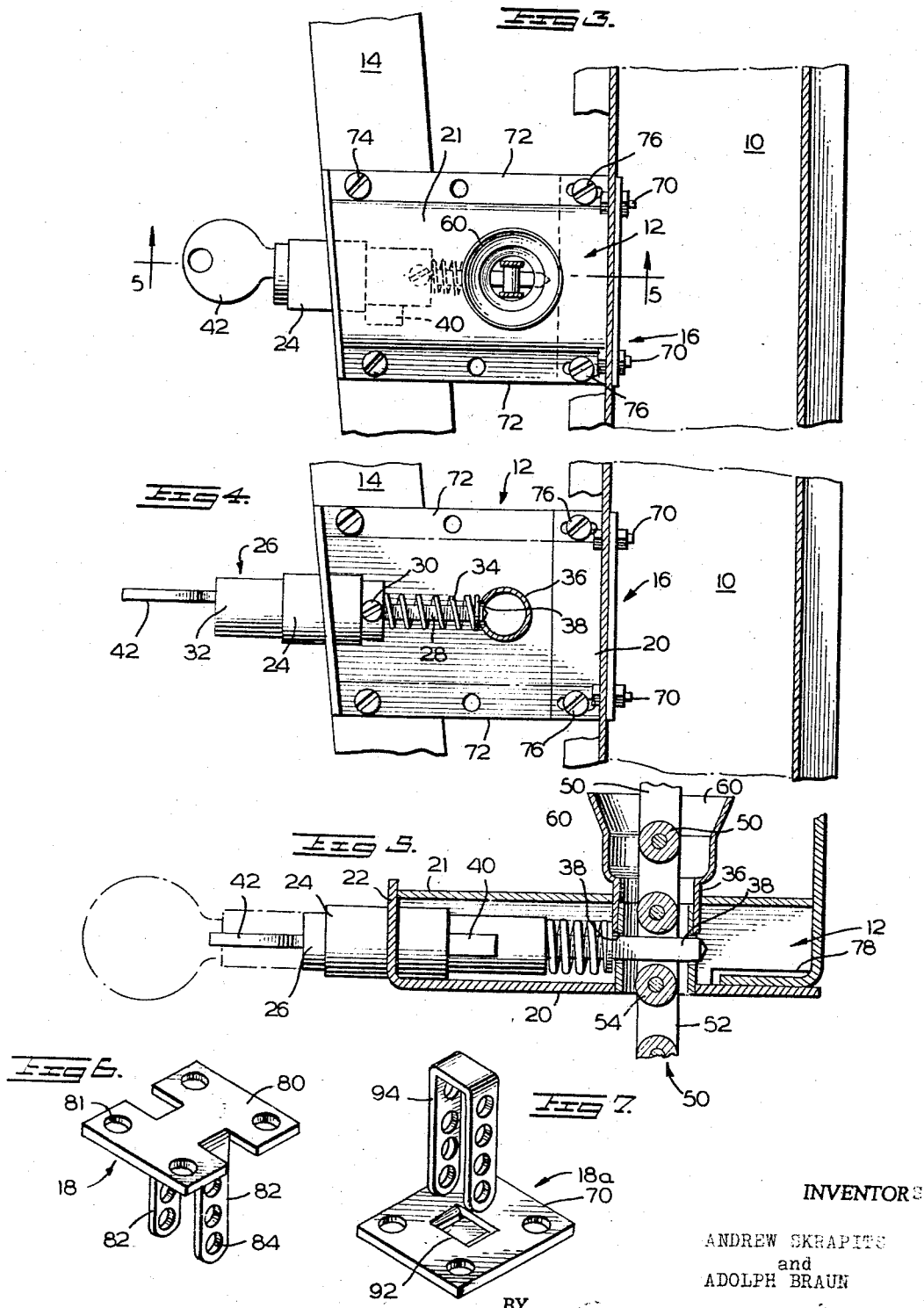

United States Patent Office 3,315,502
Patented Apr. 25, 1967

3,315,502
AUTOMOBILE HOOD LOCKING LATCH
DEVICE
Andrew Skrapits and Adolph Braun, both of Bronx, N.Y.,
assignors to Bronx Locksmiths, Inc., Bronx, N.Y., a
corporation of New York
Filed Oct. 22, 1965, Ser. No. 500,902
7 Claims. (Cl. 70—240)

The present invention provides a locking latch device for the conventional type of rear-hinged automobile engine compartment hood.

More particularly, the invention proposes a means for preventing unauthorized access to the engine and its immediate appurtenances, including particularly the automobile storage battery, by providing a key-controlled lock for the hood that covers the engine and battery.

An incidental object of the invention is to supplement the customary primary and secondary latching means for rear-hinged automobile hoods and thus to provide increased protection against accidental opening of the hood during operation of the car.

An important object is to provide anti-theft protection for the battery and other easily removable instrumentalities of the engine compartment by means that can be constructed at low cost in a form to be readily applicable to substantially all makes and styles of automobiles, that can be sold to the do-it-yourself trade with simple instructions for installation requiring no special or unusual tools or skill, which will be inconspicuous in placement and will constitute no interference with any of the operating or structural parts of the car, which will be tamper-proof to a high degree, which will be dependable and reliable in operation, and which can be unlocked by a key inserted into an unobtrusive lock located in a position where it is readily accessible from the front of the car where a person would normally stand for the purpose of actuating the conventional non-locking latch with which all cars are now provided.

With the foregoing and other objects and advantages in view, all of which it is believed will sufficiently appear to those skilled in the art as the following description of certain preferred embodiments of the invention proceeds, the device consists essentially of a bolt casing which is secured to a fixed structural cross member of the automobile front engine compartment with the front of the casing accessible from in front of the car, as by being located between cross elements of the grille, in combination with an open link chain secured to the under side of the hood, hanging vertically therefrom and adapted, with lowering of the hood, to enter a hole in the casing and be locked therein by penetration of a bolt in the casing through one of the links of the chain and to be unlocked therefrom by a key which can be inserted into the front of the casing.

The preferred embodiments of the invention, which have been thoroughly tested in actual practice and found entirely satisfactory and hence at present are preferred, are illustrated in the accompanying drawings forming part of this application, in which FIGURE 1 is a vertical longitudinal sectional view taken through the upper front portion of an automobile front engine compartment covered with a rear-hinged hood, with the hood shown locked in closed position by a device embodying the principles of the invention;

FIG. 2 is a similar view showing the device in unlocked position and with the hood partially raised, as in process of being opened or closed;

FIG. 3 is a detail horizontal cross sectional view taken on the line 3—3 of FIG. 2 but showing the chain bolted in locking position;

FIG. 4 is a similar view but showing the chain withdrawn from the locking casing, the bolt retracted into unlocking position, and the casing cover removed;

FIG. 5 is a longitudinal vertical cross sectional view taken on the line 5—5 of FIG. 3 but showing the parts on a slightly larger scale;

FIG. 6 is a perspective view of one type of bracket or anchorage for securing the chain to the under side of the automobile hood;

FIG. 7 is an exploded perspective view of the two component parts of another type of such bracket indicating the manner in which the two parts are assembled;

FIG. 8 is a sectional view like that of FIG. 1 but showing another type of lock casing and mounting;

FIG. 9 is a vertical cross sectional view taken on the line 9—9 of FIG. 8; and

FIG. 10 is an exploded perspective view of the bracket used in mounting the casing of FIGS. 8 and 9.

The hood which the present locking latch is designed to secure in closed position is the conventional type presently in almost universal use which is hinged at its rear, just in front of the fire wall at the back of the engine compartment, and is provided at its front end portion with a latch, generally including primary and secondary bolt or keeper means, manually operable to opening position by a person standing in front of the car, and operable to latched closed position by simply swinging the hood forcibly fully down onto a suitable horizontal jamb surface or member provided just in front of the radiator top or immediately behind the grille.

The present invention provides an additional latch, independent of the foregoing standard equipment, which will be key-operated from the same position in which a person must stand to operate the standard latch. Thus, the new lock does not take the place of the standard latch, but supplements it and requires no appreciable additional time or effort for its operation by the car owner or other person provided with a proper key. However, the new lock is effective to prevent unauthorized opening of the hood and hence functions to foil the thief or pilferer who has no difficulty actuating the standard manual latch but finds this insufficient for opening the hood of a car equipped with the present invention.

The details of the exemplifications of the invention illustrated in the accompanying drawings are as follows:

The reference numeral 1 designates the engine compartment in the front of a conventional type of automobile, provided with a hood or bonnet 2 which is mounted on hinges, not shown, at its rear, adjacent the fire wall of the car, near the base of the windshield, which serve to permit the hood to be swung from the substantially horizontal closed position shown in FIG. 1 to an elevated wide open position in which it assumes an angle of some 45° more or less. FIG. 2 shows the hood partially open, i.e., in an intermediate position between closed and fully open.

The hood is generally formed in shallow dome shape, constituting a flat crowned contour having central areas higher than its side and front edges. Most hoods include a double thickness of metal across their front zones for the purpose of providing necessary rigidity to the wide expanse of relatively thin gauge metal. Conventionally in many cars this takes the form of a cross batten like that shown at 4, which, with the beaded or inturned lower front edge 6, provides adequate reinforcement and stiffness for the hood. In some cars the edge 6 closes down into flat seating engagement on the top cross member 8 of the radiator grille as shown in FIGS. 1 and 2; in others the hood front edge considerably overhangs the grille and seats principally along the hood sides. The conventional standard latching devices are generally incorporated in the batten 4 and in a stanchion, not shown, forming part of the car frame in the longitudinal center line of the vehicle, just behind the grille and just in front of the heavy front frame upper cross member 10 which spans the engine compartment. It will be understood that the arrangements are subject to considerable variation and that the showing in FIGS. 1 and 2 is typical.

In order not to conflict with the standard manually operable latch which is always located at the longitudinal center line of the car, the new locking latch is best mounted slightly off center, but as near as practicable to the center line. The reason is that a substantially central location serves to lessen the leverage that can be exerted by a thief prying up on an edge of the hood remote from the lock.

Assuming, therefore, in the illustrated typical car design, that the batten 4 overlies the space between the frame cross member 10 and the top cross member 8 of the grille, the lock casing 12 will be installed as shown, seated on a grille cross member 14 and securely bracketed to the frame member 10 by one or another of the versatile bracket fittings 16 shown in FIGS. 1 and 2. These fittings will be described more in detail hereinafter.

The chain will have one end secured to the batten 4 by means of one or another of the versatile chain brackets 18 fastened to the batten in such a position that when the hood is closed, as in FIG. 1, the lower end of the chain will coincide with an opening in the top of the lock casing 12, as will be explained.

The lock casing is a flat boxlike receptacle that houses a key-operated bolt mechanism of known type adequately shown in FIGS. 4 and 5. The flat plate bottom 20 of the casing is covered by a plate of inverted U-shape in cross section forming a combined top 21 and pair of side walls. The bottom plate 20 is turned up to provide a front wall 22 which is penetrated by a tubular shroud 24 spot welded in position enclosing a bolt assembly 26. This assembly terminates rearwardly in a bolt 28 which has its front end fastened at 30 to the rear end of a slide member 32 in the shroud 24. A spring 34 surrounding the bolt 28, reacting in tension between the front wall of a short tube 36 upstanding from the bottom of the casing in the rear portion of the casing and the rear end of the slide member 32, serves to bias the bolt assembly forwardly, i.e., out from the front end of the casing, with the rear end of the bolt 28 withdrawn from the tube 36. However, the bolt assembly can be pushed rearwardly in the shroud 24, so as to cause the bolt 28 to enter the tube 36 through a hole 38 in its front wall, and permit a spring (not shown) inside the slide member 32 to project a dog or detent 40 to be projected out from the side of the slide member behind the inner or rear end of the shroud 24 and thus hold the bolt assembly in its rearwardly extended position, with the spring 34 compressed and the bolt 28 extended diametrically through the tube 36.

The dog 40 is retractible by a key 42 that can be fitted into a keyhole in the front end of the slide member 32 and rotated to withdraw the dog by mechanism that is well known and requires no explanation.

The chain that depends from the bracket 18 is shown at 50 and may be of any suitable open link construction. However, we prefer to use the roller type chain shown in the drawings. This is a sprocket chain widely used in the drive of bicycles and other mechanisms and comprises essentially flat plate links 52 pin connected in parallel pairs, with rollers 54 journaled on the pins. The rollers are spaced by the link pins sufficiently to form spaces adequate for penetration by the blunt pointed end of the bolt 28. The rotatability of the rollers facilitates smooth entry of the bolt into one or another of the spaces when, as shown in FIGS. 2 and 5, the lower end of the chain, depending by gravity from the fixture 18, enters the tube 36 on lowering of the hood and the bolt assembly is pushed in, from the FIG. 4 position to the position shown in FIGS. 3 and 5, to cause the bolt to penetrate the tube and to be fixed in that position by projection of the dog 40 into abutment behind the inner end of the shroud 24.

To facilitate this entry of the chain into the tube 36 and render it unnecessary to exercise any great degree of care in positioning the brackets that fix the positions of the chain and the lock casing, it is useful to extend the tube 36 upwardly and flare its top into the funnel shape shown at 60.

However, it will be recognized that it is essential that the chain and the lock casing be so related that closing the hood will unfailingly direct the lower end of the depending chain accurately into the opening in the lock casing. This requires use of some of the versatile bracket fittings provided by the invention, such as are shown in the several figures.

In FIGS. 1–5 the mounting means for the lock casing comprises an angle bracket 16 the vertical leg of which is provided with vertical slots for receiving bolts 70 for securing the bracket to the car frame member 10 in any vertically adjusted position within a reasonable range—a range broad enough to accommodate any grille surface 14 on which it may be desired to rest the casing. The bottom of the casing may be extended sidewise to form flanges 72 projecting beyond the casing top 21 having holes in their front portions for receiving self-tapping screws 74 securing the casing to the grille member, and slots at the rear of these flanges adjustably receive bolts 76 fastening the horizontal leg of the bracket 16 to the casing bottom, in undercut slots 78 in the casing side walls.

It will be evident that the foregoing arrangement provides a considerable degree of adjustability, so that reasonable inaccuracy in fixing the chain-securing bracket 18 can be accommodated.

The principal adjustment requirement of the bracket 18 is relative to the degree of penetration of the chain into the lock casing tube 36, to produce proper alignment of the bolt 28 with one of the link openings in the chain. To this end the bracket 18 conveniently comprises a base plate 80 having a plurality of holes for receiving self-tapping screws 81 that will hold it securely onto the batten 4, and a pair of depending legs 82 having a series of aligned holes 84. The chain is affixed to the bracket by extending an elongated headed pin 86 through the endmost links 52 of the chain and any pair of aligned holes in the legs and securing the pin in place by a cotter key or the like.

In the bracket of FIG. 6 the legs are integral with the base plate, being struck down from slots cut into the blank.

In the bracket 18a shown in FIG. 7 the base plate 90 is stamped with a central depression 92 having two short slots cut into its opposite sides, and a U-shaped pair of integrated legs 94 are dropped down into this depression and spot welded in place, with the bight of the U seated in the depression and flush with the plate.

FIGS. 8–10 illustrate another form of bracket arrangement for mounting the locking casing. Here the angle plate 100, whose vertical leg is bolted to the frame member 10, has a front lip 102 upturned from its horizontal leg. Angle slots 104 are cut into this lip, and registering, aligned similar slots are cut into the vertical leg. Angle bars 106 are slidably received in these slots and can be affixed in any degree of forward projection by bolts 108 set in any of the series of holes 109 in the bars and similar holes in the short horizontal leg 110 of the bracket. The forward end portions of these angle bars overlie the laterally projecting flanges 72 of the lock casing, which in this instance are provided with long slots 112. Bolts 114 standing through these slots and the holes 109 serve to position the casing adjustably forward or back on the angles 106, anywhere in a considerable range of positions.

It will be recognized that the purpose of the adjustability of positioning the casing is to mount the front end of the casing in such relation to the grille of the car that the keyhole will be accessible without undue difficulty, while the shroud and the slide member 32, whether projected or retracted, are not conspicuous.

We claim:

1. An automobile locking latch device for a rear-hinged automobile hood comprising a casing secured to a fixed cross member of an automobile front engine compartment with the front of the casing accessible from in front of the automobile, lock mechanism in said casing including a bolt operable by a key insertable through the front of the casing, and a chain secured to the under side of the automobile hood, hanging vertically therefrom and adapted, when the hood is lowered, to enter said casing through a hole therein and to latch the hood in lowered position by penetration of said bolt between links of the chain.

2. An automobile locking latch device as claimed in claim 1 in which the chain is of the roller type.

3. An automobile locking latch device as claimed in claim 1 in which the chain comprises a plurality of longitudinal links arranged in parallel pairs connected by cross pins with rollers journaled on said pins for rotation, thereby facilitating penetration of the bolt when engaging one of said rollers.

4. An automobile locking latch device as claimed in claim 1 including a bracket mounting the casing on the fixed cross member and arranged for adjustably positioning the casing to bring the hole therein accurately beneath the descending lower end of the chain when the hood is lowered.

5. An automobile locking latch device as claimed in claim 1 including a bracket mounting the upper end of the chain on the under side of the automobile hood and arranged for adjustably positioning the chain to bring the lower end thereof accurately into the hole in the casing when the hood is lowered.

6. An automobile locking latch device as claimed in claim 1, including a funnel projecting from the upper surface of the casing surrounding the hole therein to facilitate entry of the chain into the casing.

7. An automobile locking latch device as claimed in claim 1 including a bracket mounting the casing on the fixed cross member and arranged for adjustably positioning the casing to bring the hole therein accurately beneath the descending lower end of the chain when the hood is lowered and a bracket mounting the upper end of the chain on the under side of the automobile hood and arranged for adjustably positioning the chain to bring the lower end thereof accurately into the hole in the casing when the hood is lowered.

References Cited by the Examiner

UNITED STATES PATENTS

| 1,804,387 | 5/1931 | Dorsey et al. | 70—240 |
| 2,098,189 | 11/1937 | Kistner | 70—134 X |
| 2,454,794 | 11/1948 | Hakanson | 292—264 |
| 2,608,084 | 8/1952 | Poulson | 70—134 X |
| 2,743,601 | 5/1956 | Dlugatch | 70—240 |

MARVIN A. CHAMPION, *Primary Examiner.*

RICHARD E. MOORE, *Examiner.*